United States Patent Office 3,296,110
Patented Jan. 3, 1967

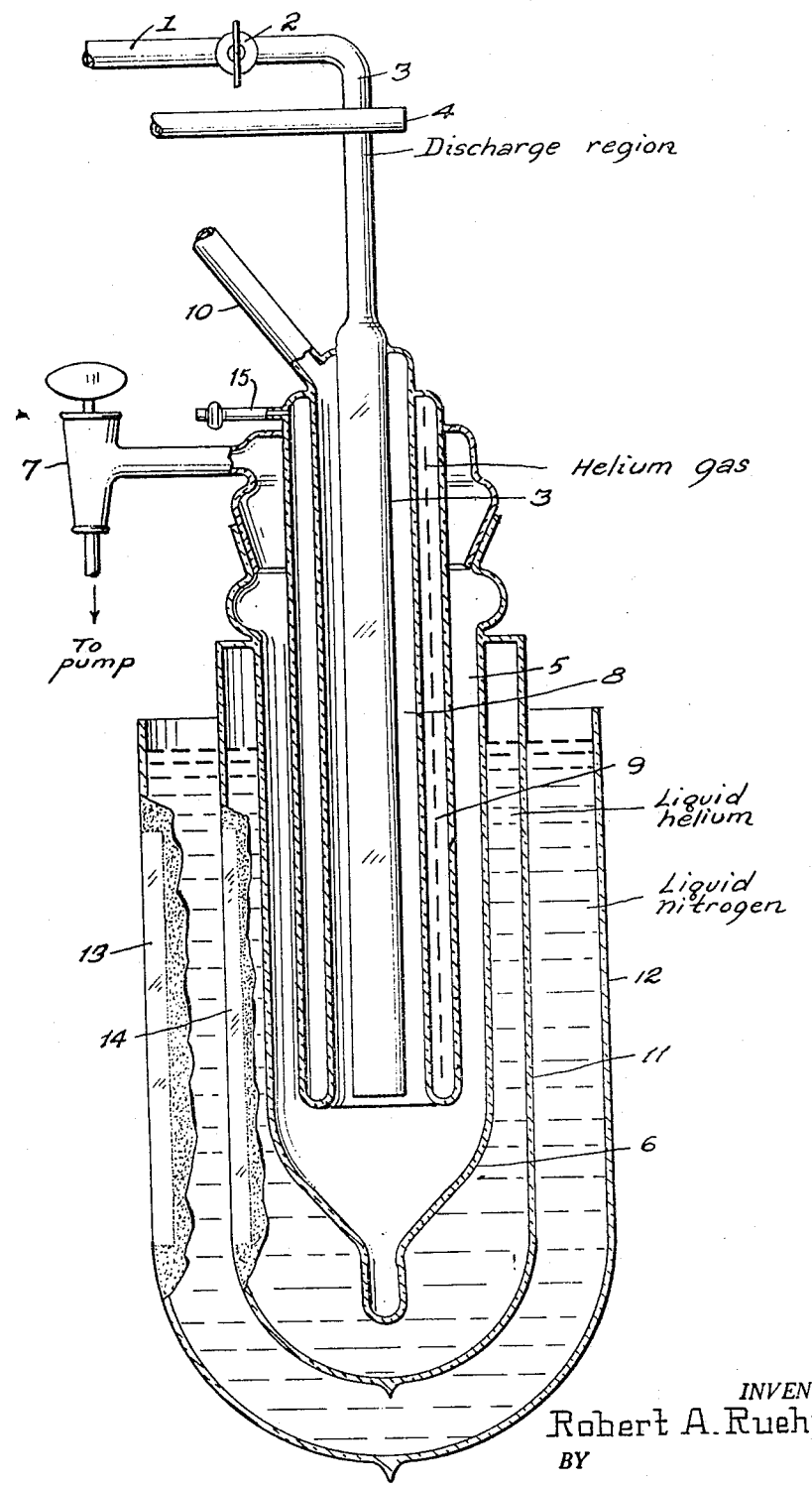

3,296,110
PROCESS FOR MAKING POLYOXYMETHYLENE
Robert A. Ruehrwein, St. Louis, Mo., assignor to the United States of America as represented by the Secretary of the Army
Filed July 19, 1965, Ser. No. 480,543
3 Claims. (Cl. 204—169)

This application is a continuation-in-part based upon the application of Robert A. Ruehrwein, Serial No. 141,920, filed September 29, 1961, under the title "Process for Making Polyformaldehyde," which has been abandoned.

This invention relates to a process for making polyoxymethylene at extremely low temperatures particularly from a blend of atomic oxygen and ethylene.

Polyoxymethylene is a high polymer of oxymethylene units, having a formula as follows:

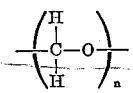

wherein $n$ is a large number greater than 6. Polyoxymethylene is an important high polymer or plastic of commerce and has engineering utility of a high order. The polymer is characterized by useful properties, such as high tensile strength, elongation and impact strength, and in addition, it exhibits a stiffness and high softening temperature. Commercial polyoxymethylenes have been available under the trade names Delrin and Celcon.

Polyoxymethylene has heretofore been prepared by processes which use catalysts, supports therefor and high temperatures of the order of 415° C. to 500° C. The use of catalysts and high temperatures are often accompanied by disadvantages. The product formed may be contaminated with catalytic material or degraded by the high temperature.

It is now possible in view of this invention to produce polyoxymethylene by subjecting oxygen gas to an electrodeless electric discharge and blending the products of said discharge with ethylene gas at extremely low temperatures. A volatile product separated from this low-temperature blend is condensed and allowed to remain standing until the polymer has precipitated therein.

Therefore, an object of this invention is to provide a process for the production of polyoxyethylene from ethylene and oxygen without the use of catalysts and high temperatures.

Another object of this invention is to provide a method for producing polyoxymethylene in substantially pure form.

A further object of the invention is to provide a low temperature means for obtaining polyoxymethylene from oxygen free radicals and ethylene gas.

The foregoing and other objects and advantages will become apparent from the following detailed description of the invention.

In accordance with this invention, oxygen gas is subjected to a microwave electrodeless electric discharge at a pressure of about 0.1 to 10 mm. of Hg, said discharge being maintained by any suitable high frequency source such as a wave-guide resonator. The products of this discharge are then blended with ethylene gas at extremely low temperatures, between about 4.2° K. and 77° K., preferably at about the lower limit. A condensate forms at this temperature which is deeply colored purple.

The condensate is then allowed to warm up gradually. Upon warming to a temperature of 48° K., the condensate becomes completely colorless. Upon further warming, oxygen gas vaporizes from the condensate and is removed from the system by means of a Toepler pump. Upon further warming to a still higher temperature of about 150° K., ethylene gas is vaporized from the condensate, and this gas is then withdrawn from the system by distilling it into a glass tube cooled by liquid nitrogen. When the condensate is subjected to a still higher temperature of about 250° K. to 300° K., a volatile product is separated by distillation and readily condensed to a liquid. The liquid is left in a sealed tube at ambient or room temperature for several days with an occasional warming above room temperature, as high as 50° C., until a precipitate is formed therein. The occasional warming and standing of the liquid is continued until no further formation of precipitate is visible. The precipitate may be recovered by any well known method such as filtration or centrifugation.

The precipitate is identified as polyoxymethylene by several methods. The infrared absorption spectrum of the material is found to be identical with that of polyoxymethylene from other sources. The product of this invention is found to be insoluble in acetone, benzene, hot water and hot toluene. Its melting point is about 160° C. By analysis it is found to contain 41.78% C. and 7.37% H.

The single figure of the drawing illustrates the apparatus used for carrying out the process in accordance with the invention.

More specifically with reference to the apparatus in the drawing, oxygen gas supplied from a cylinder (not shown) is introduced through a supply tube 1; the flow thereof is controlled by means of a stopcock 2. The gas is throttled into a Pyrex tube 3, which is open at its lower end, and thence through an electrodeless electric discharge 4 (shown diagrammatically) at a low pressure in the range of about 0.1 mm. to 10 mm. of Hg, preferably at about 1 mm. of Hg. The discharge is maintained by a wave-guide resonator operated at 2450 megacycles per second power supply (125 watts output).

Following its passage through the electric discharge, the oxygen gas is converted to free oxygen radicals which are led rapidly into Pyrex cylinder 5, the lower part 6 of said cylinder being immersed in liquid helium. The cylinder is equipped with a vacuum pump connection 7 for removing gases by a pump (not shown) from said cylinder. Surrounding the Pyrex tube 3 is another tube 8, also open at its lower end and equipped with a hollow cylindrical jacket 9. Ethylene gas flowing into inlet tube 10 from a supply tank (not shown), passes down tube 8 and into the lower part 6 of cylinder 5 where the gas is blended and reacted with oxygen free radicals. The lower part of cylinder 5 which is immersed in liquid helium acts as a trap by freezing out all gases; the vacuum created therein when larger volume of gases condense into solid form constitutes, in effect, a high speed pump causing the gases to flow rapidly toward the lower part of the cylinder.

In order to prevent condensation or solidification of the ethylene or oxygen within tubes 3 or 8, these tubes are kept at a relatively high temperature, as high as room temperature. This temperature is maintained therein by passing a relatively warm gas, such as helium or nitrogen into cylindrical jacket 9. The passage of such a sheath of warm gas causes only a slight heat input below the liquid helium level, but the upper portions of tubes 3 and 8 remain at temperatures above freezing. By this means, oxygen free radicals and ethylene gas pass abruptly form a region of relatively high temperature to a region of extremely low temperature near the bottom of Pyrex cylinder 5 where they blend, react and condense therein in solid form.

The liquid helium is contained in a Dewar flask 11 and is insulated from the outside temperature by an outer bath of liquid nitrogen contained in Dewar flask 12. The liquid nitrogen bath reduces the amount of liquid helium required to maintain the lower part of cylinder 5 at a temperature near 4.2° K. (the boiling point of helium). Dewar flasks 11 and 12 can be raised and lowered by means of a screw elevator (not shown) for varying the temperature in the lower part of cylinder 5. The level of liquid helium may be maintained at a constant level around cylinder 5 by slowly raising the Dewar flasks as the helium boils away. Control of the Dewar flasks' elevation gives good temperature control, and it is possible by this means to warm or cool the ethylene oxygen deposit at will or hold it at any desired temperature for hours.

Following the formation of the ethylene-oxygen deposit, the lower end of cylinder 5 is warmed by lowering Dewar flasks 11 and 12. As the deposit is warmed, various constituents are evaporated and removed by means of a vacuum pump, a Toepler pump or by distillation through connection 7. The fraction which is volatilized in the temperature range of 250° K. to 300° K. is removed by distillation and condensation in a cooled glass tube. At room temperature this fraction consists of a single phase of water white liquid. It is then placed in a sealed container for several days, for example for 3 days, at ambient temperatures and an occasional warming until precipitation occurs. As noted previously, infrared analysis, solubility data and melting point indicate that this precipitate is polyoxymethylene.

While the foregoing embodiment has been set forth in considerable detail, it is to be understood that many modifications and variations will present themselves to those skilled in the art without departing from the spirit of this invention or the scope of the appended claims.

Having thus described my invention, what I claim and desire to secure by Letters Patent is:

1. A process for making polyoxymethylene comprising:
   subjecting oxygen gas to a microwave electrodeless electric discharge at a pressure in the range of from 0.1 mm. to 10 mm. of Hg,
   blending the products of said discharge with ethylene gas at a temperature in the range of between 4.2° K. and 77° K. to form a solid condensate therewith,
   removing the volatile fraction from said condensate by distillation at a temperature in the range of about 250° K. to 300° K., and
   maintaining said fraction as a liquid at room temperature until precipitation of said polyoxymethylene has occurred therein.

2. A process for making polyoxymethylene comprising:
   subjecting oxygen to a microwave electrodeless electric discharge at ambient temperature at a pressure in the neighborhood of 1 mm. of Hg,
   passing the products of said discharge and ethylene gas into a region maintained at a temperature in the range of between 4.2° K. and 77° K. to form a solid condensate therein,
   removing the volatile fraction from said condensate by distillation at a temperature in the range of about 250° K. to 300° K.,
   maintaining said fraction as a liquid at room temperature until precipitation of polyoxymethylene has occurred therein, and
   filtering said polyoxymethylene from said liquid.

3. A process in accordance with claim 2 which includes the step of heating said liquid intermittently to a temperature as high as 50° C. to promote precipitation of polyoxymethylene therein.

References Cited by the Examiner

UNITED STATES PATENTS

| | | | |
|---|---|---|---|
| 2,767,203 | 10/1956 | Rambosek et al. | 260—606 |
| 2,892,766 | 6/1959 | Broida et al. | 204—176 |

OTHER REFERENCES

Walker, J. F., "Formaldehyde," Heinhold Publishing Corp., New York, 1953, 2nd edition, pages 34, 40, 42–43.

Wheeler, T. S. et al., Jour. Soc. Chem. Ind., October 16, 1922, pages 331T–332T.

LEON ZITVER, *Primary Examiner*

H. T. MARS, *Assistant Examiner.*